(12) United States Patent
Vijayakumar et al.

(10) Patent No.: US 12,737,990 B1
(45) Date of Patent: Sep. 15, 2026

(54) SYSTEMS AND METHODS FOR DYNAMIC THREE-DIMENSIONAL CONTENT PREFETCHING AND CACHE EVICTION

(71) Applicant: Miris, Inc., Culver City, CA (US)

(72) Inventors: Daniel T. Vijayakumar, Peterborough (CA); Rodney David Smith, Draper, UT (US)

(73) Assignee: Miris, Inc., Culver City, CA (US)

( * ) Notice: Subject to any disclaimer, the term of this patent is extended or adjusted under 35 U.S.C. 154(b) by 0 days.

(21) Appl. No.: 19/381,531

(22) Filed: Nov. 6, 2025

(51) Int. Cl.
*G06T 19/00* (2011.01)

(52) U.S. Cl.
CPC .................................. *G06T 19/003* (2013.01)

(58) Field of Classification Search
CPC ..... G06T 19/003; G06T 2210/36; G06T 5/92; G06T 7/70; G06T 15/08
See application file for complete search history.

(56) References Cited

U.S. PATENT DOCUMENTS

| | | | | |
|---|---|---|---|---|
| 12,380,647 | B1 * | 8/2025 | Looper | G06T 17/00 |
| 2016/0155260 | A1 * | 6/2016 | Jenkins | G06T 19/003 345/419 |
| 2021/0375062 | A1 * | 12/2021 | Fleischman | G06F 18/24 |
| 2025/0157132 | A1 * | 5/2025 | Morel | G06T 17/00 |

* cited by examiner

*Primary Examiner* — Daniel F Hajnik
*Assistant Examiner* — Thomas John Foster
(74) *Attorney, Agent, or Firm* — Ansari Katiraei LLP; Arman Katiraei; Sadiq Ansari

(57) ABSTRACT

Disclosed is a system and associated methods for dynamic three-dimensional (3D) content prefetching and cache eviction. The prefetching includes a streaming system receiving the 3D content and determining navigable paths within the 3D space of the 3D content. The streaming system receives a request to present the 3D content from a particular field-of-view and streams a first set of primitives that are positioned within the particular field-of-view to the requesting client device in response to the request. The streaming system prefetches a second set of primitives that are positioned outside the particular field-of-view, that are positioned nearest to a particular navigable path in the particular field-of-view, and that have proximity to a current position about the particular navigable path associated with the particular field-of-view, and streams the second set of primitives to the client device while the particular field-of-view remains unchanged.

20 Claims, 8 Drawing Sheets

SYSTEMS AND METHODS FOR DYNAMIC THREE-DIMENSIONAL CONTENT PREFETCHING AND CACHE EVICTION

BACKGROUND

Prefetching involves predicting the next data that likely follows currently requested data and requesting and/or streaming the next data before changing from the currently requested data. The decision on what to prefetch becomes more challenging when requesting and/or streaming three-dimensional (3D) content (e.g., static 3D objects or scenes, 3D animations, 3D games, 3D movies, virtual reality, augmented reality, or mixed reality content, and/or other spatial computing experiences). The user may have 360-degrees of freedom with which to view or move within the 3D content. Accordingly, the next data that may be prefetched may include any of the 3D content primitives that surround the current field-of-view. Also, the 3D content may position primitives associated with different objects next to one another or on different planes such that the primitives of a first object may block viewing of another object. If the primitives of the different objects are not differentiated, then the primitives of the blocked object may be prefetched because they are positioned in front of the virtual camera that established the current field-of-view even though there is no possibility of the blocked object primitives being used due to the obstruction by the first object. Accordingly, there is a need for intelligent prefetching of 3D content that better predicts the primitives that are likely to come into the field-of-view and be visible from the larger 360-degree 3D space of the 3D content.

There is also a need to improve cache eviction for 3D content. Typically, data or content that is cached first is evicted first once the cache becomes full. Time-based cache eviction is ineffective for 3D content because there is no linear or predetermined viewing order of the 3D content. Primitives that were prefetched at an earlier time may have a greater likelihood of being viewed at a later time based on the 360-degree freedom of movement with which the user may view the 3D content. Accordingly, there is a need for improved cache eviction for 3D content to avoid time and resource penalties associated with evicting previously prefetched or cached 3D content primitives that are subsequently used for an updated field-of-view.

DETAILED DESCRIPTION OF PREFERRED EMBODIMENTS

Figure 1:
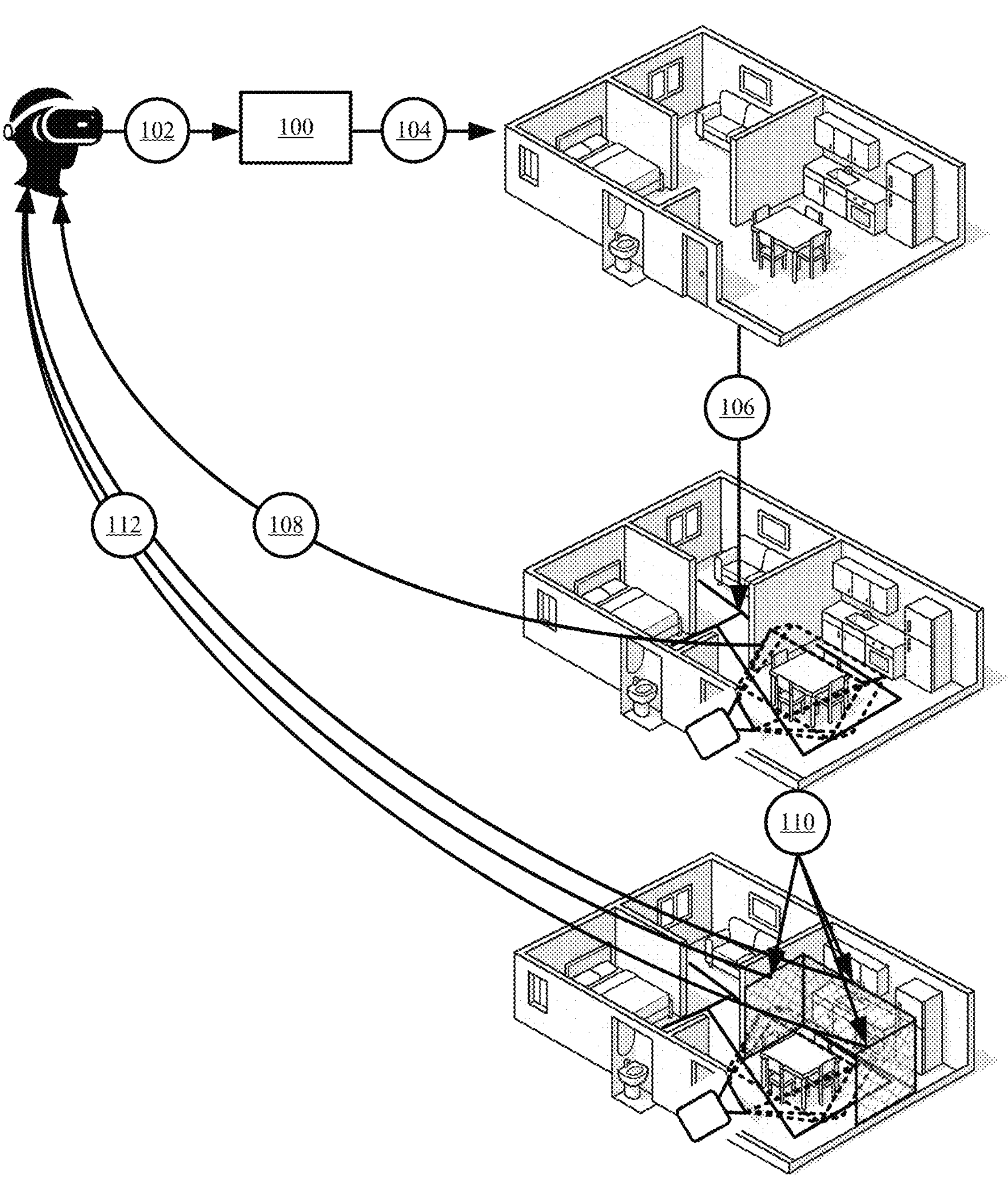
FIG. 1 illustrates an example of dynamically prefetching primitives for 3D content based on modeled navigable paths within three-dimensional (3D) content in accordance with some embodiments presented herein.

The following detailed description refers to the accompanying drawings. The same reference numbers in different drawings may identify the same or similar elements.

Provided are systems and associated methods for dynamic three-dimensional (3D) content prefetching and cache eviction. The dynamic 3D content prefetching includes analyzing the 3D content to determine valid or expected navigable paths within the 3D space of the 3D content, differentiating between obstructed and unobstructed primitives of the 3D content about the different navigable paths, and prefetching the unobstructed primitives that are closest to the current position associated with a valid or expected navigable path. The dynamic cache eviction involves continuously changing priority values of prefetched or cached primitives based on their proximity to the current position about a valid or expected navigable path and evicting those primitives with the lowest priority value regardless of when those primitives were entered into the cache.

The dynamic 3D content prefetching uses navigable path modeling and object or feature classification to generate a dynamic heat map. The dynamic heat map is defined with priority values for different primitives based on the proximity of the different primitives to the determined navigable paths. The priority values may be used predict or prioritize the 3D content primitives to prefetch. The navigable path modeling may include determining paths for traversing through a 3D space or a 3D scene of the 3D content, and prioritizing the primitives that are closest to the paths. In some embodiments, a neural network or other artificial intelligence (AI) is used to detect valid navigable paths or predict expected paths for traversing through the 3D space or the 3D scene of the 3D content.

Object or feature classification may be used in combination with or independent of the navigable path modeling in order to determine which primitives to prefetch. The object or feature classification may including detecting sets of primitives that form obstructions or barriers to the navigable path and/or to the viewing of the 3D content primitives that are positioned behind the obstructions or barriers. The dynamic 3D content prefetching avoids prefetching any primitives that are not visible in the current field-of-view or from the current navigable path due to the detected obstructions or barriers created by other primitives.

The dynamic cache eviction performs a client-side comparison of the prefetched or cached primitives in cache to one or more navigable paths in the current field-of-view, and modifies the primitive priorities based on their distance from the current position in the one or more navigable paths in the current field-of-view. The dynamic cache eviction includes removing the cached primitives with the lowest priorities that represent primitives about different navigable paths and/or primitives that are furthest from the current position in the one or more navigable paths. Additionally, the dynamic cache eviction includes determining which primitives are obstructed or not visible from the one or more navigable paths in the current field-of-view and prioritizing the eviction of those primitives from the cache.

FIG. 1 illustrates an example of dynamically prefetching primitives for 3D content based on modeled navigable paths within the 3D content in accordance with some embodiments presented herein. Streaming system 100 receives (at 102) a request for 3D content. The 3D content is defined with a set of primitives. Each primitive of the set of primitives may be defined with a position in a 3D space and visual characteristics to present at that position. The primitives may include points from a point cloud encoding of the 3D content, meshes from a mesh model encoding of the 3D content, splats from a Gaussian splat encoding of the 3D content, and/or primitives of other 3D formats. The requested 3D content may be static or dynamic. Static 3D content may include a 3D object, 3D scene, or 3D environment that does not change and that a user may move within in order to view from different positions and/or perspectives. Dynamic 3D content may include a 3D animation, 3D game, 3D movie, virtual reality, augmented reality, or mixed reality content, and/or other spatial computing experience that dynamically, programmatically, or temporally changes.

Streaming system 100 retrieves (at 104) the 3D content primitives and determines (at 106) one or more navigable paths from which to view the 3D content. The one or more navigable paths correspond to positions within the 3D space of the 3D content that a user may move along without obstruction to view different parts of the 3D content or to view the 3D content from different angles or perspectives. The one or more navigable paths may include regions in the 3D space that are not defined with any primitives and that are surrounded by primitives on one or more sides. In some embodiments, the 3D content may restrict 3D movements to a ground plane such that the navigable paths exist about the ground plane even though a user is free to look in 360-degrees around the ground plane.

In some embodiments, streaming system 100 determines (at 106) the one or more navigable paths by analyzing the primitive positions and/or their surface normals to determine the outer face of different features or surfaces formed by the primitives and to define the navigable paths to move between the outer faces of the different features or surfaces. In some embodiments, streaming system 100 determines (at 106) the one or more navigable paths using an artificial intelligence (AI) simulator. Streaming system 100 renders the 3D content, presents the rendered visualizations to the AI simulator, and the AI simulator emulates the role of a human user to move within the rendered 3D environment. The AI simulator detects obstructions that prevent movement past those obstructions and discovers the navigable paths about which there are no obstructions.

Streaming system 100 streams (at 108) an initial subset of the 3D content primitives to the requesting user. The initial subset of 3D content primitives may include the primitives that are positioned within an initial field-of-view that is requested by the user. For instance, the user request may specify a position and orientation for a virtual camera within the 3D space of the 3D content, and streaming system 100 may stream the subset of primitives within the field-of-view established with the virtual camera at the specified position and orientation. In some embodiments, the initial subset of the 3D content primitives may include the same subset of primitives that are presented to all users that request the 3D content. For instance, the subset of primitives may include the primitives that are visible from a default or initial field-of-view or the first primitives that are streamed to the user in response to starting a 3D movie, a 3D game, or a 3D spatial computing experience.

Streaming system 100 prefetches (at 110) the primitives that are positioned closest to the current viewing position, that are not in the current field-of-view, and that are along the navigable path from the current viewing position. The prefetched (at 110) primitives do not include obstructed primitives that are behind other primitives forming the walls or barriers of the navigable path.

In some embodiments, streaming system 100 prefetches (at 110) the primitives in response to prefetch requests issued by the client device after requesting and/or downloading the subset of primitives for the current field-of-view. In some such embodiments, streaming system 100 provides the client device with a 3D content manifest in response to the initial request for the 3D content. The 3D content manifest may include a map of the 3D space in which the 3D content is defined and the determined (at 106) navigable paths within the 3D space. The map may list the 3D content primitives and/or their positions within the 3D space so that the client device may determine which primitives to request for the current field-of-view and which primitives to prefetch that are positioned closest to the current viewing position, that are not in the current field-of-view, and that are along the navigable path from the current viewing position. In some embodiments, the 3D content manifest lists the primitives associated with different frames or visualizations of the 3D content and the navigable paths associated with the 3D space spanned by the different frames or visualizations. In some embodiments, the 3D content manifest includes a heatmap that assigns priority values to the 3D content primitives based on their distance to a determined (at 106) navigable path. In some such embodiments, the client device may select the primitives to prefetch by adjusting the heatmap priority values according to the current position of the current field-of-view in the 3D space of the 3D content and by requesting the primitives with the highest adjusted priority values.

In some embodiments, streaming system 100 prefetches (at 110) primitives based on additional criteria including a predicted camera frustum movement. For instance, rather than prefetch all primitives that are positioned closest to the current viewing position, that are not in the current field-of-view, and that are along the navigable path from the current viewing position, streaming system 100 may determine or predict that the camera or field-of-view will change in a particular direction and may prioritize the prefetching of primitives in the particular direction that are positioned closest to the current viewing position, that are not in the current field-of-view, and that are along the navigable path from the current viewing position. Other criteria that may alter the selection of prefetched primitives may include prioritizing primitives based on popularity or whether the primitives are static or dynamic/animated. For instance, streaming system 100 may track the amount of time that different 3D content primitives are viewed or focused on by different users, and may prioritize the prefetching of the most viewed primitives that are positioned closest to the current viewing position, that are not in the current field-of-view, and that are along the navigable path from the current viewing position. Similarly, streaming system 100 may prioritize the prefetching of primitives that are static and remain unchanged in different frames of the 3D content over dynamic or animated primitives that may be visible for some frames and not other frames. Alternatively, streaming system 100 may prioritize the prefetching of dynamic or animated primitives over the static primitives when the dynamic or animated primitives are predicted to draw user focus over the static primitives.

Streaming system 100 streams (at 112) the prefetched (at 110) primitives to the requesting user before the field-of-view changes to one that includes the prefetched (at 110) primitives. Streaming system 100 streams the prefetched (at 110) primitives when there is unused bandwidth available, the network is idle, and/or the user is not requesting changing fields-of-view or different subsets of primitives than those that were previously streamed (at 108).

The user may submit a request for an updated field-of-view. Streaming system 100 selects and streams the primitives for the updated field-of-view that have not already been streamed as a result of overlap with the previous field-of-view or as a result of the prefetching. In between requests for an updated field-of-view, streaming system 100 may prefetch and stream primitives that are not in the current field-of-view and that are positioned closest to the current position about a navigable path in the 3D space of the 3D content.

The 3D content primitive prefetching may also be performed prior to or independent of the streaming of 3D content primitives for a requested field-of-view. For instance, primitives for a default or expected initial field-of-view may be prefetched when streaming the 3D content manifest or when a user navigates through a user interface associated with accessing the 3D content.

The prefetching of primitives along the navigable path may be based on a heatmap. The heatmap may be defined with priority values for the 3D content primitives. The priority value for a particular primitive may be derived based on the minimum distance between the particular primitive and a navigable path.

Figure 2:
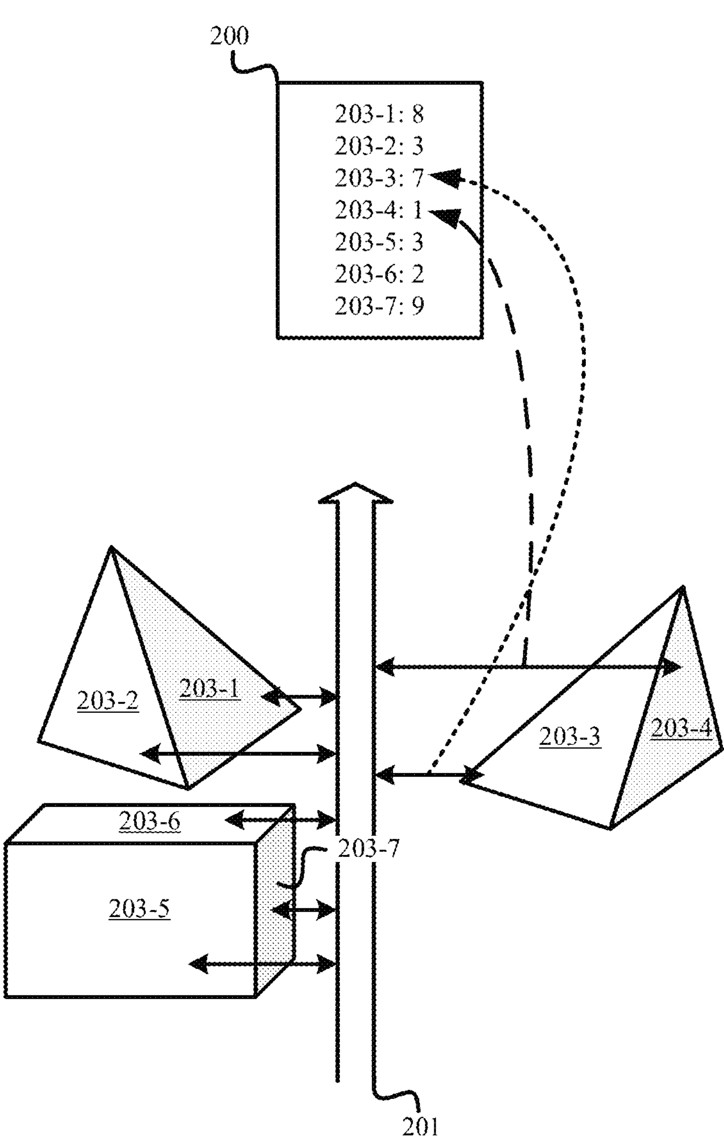
FIG. 2 illustrates an example of a heatmap for prefetching 3D content primitives in accordance with some embodiments presented herein.

FIG. 2 illustrates an example of a heatmap for prefetching 3D content primitives in accordance with some embodiments presented herein. Streaming system 100 generates heatmap 200 for the 3D content primitives based on the minimum distance of each primitive to a navigable path. In some embodiments, the heatmap values are defined separate from the positional attributes and visual characteristic attributes of the primitives. In some other embodiments, the heatmap values are embedded as a new attribute of the primitives. For instance, the heatmap value specifying the distance of a primitive to a navigable path may be defined as a new positional attributes or a new visual characteristic attribute.

FIG. 2 illustrates navigable path 201 and several mesh primitives 203-1, 203-2, 203-3, 203-4, 203-5, 203-6, and 203-7 (hereinafter collectively referred to as "primitives 203" or individually as "primitive 203") that are positioned adjacent to navigable path 201. Streaming system 100 measures the minimum distance between each primitive 203 and navigable path 201, and creates an entry in heatmap 200 to represent the proximity of each primitive 203 to navigable path 201. Each entry may include an index or other identifier for the represented primitive 203 and a priority value that is derived from the distance measurement. In some embodiments, the priority value may be adjusted based on the direction of the primitive 203 surface normal. For instance, if the surface normal of a primitive 203 is directed away or is not oriented towards navigable path 201, then the priority value may be reduced or set to zero as the primitive 203 is likely not visible from navigable path 201.

The priority values are dynamic in the sense that they are based on the user's current position about the navigable path. Changing the priority values based on the distance between the primitive in 3D space and the current position about the navigable path prioritizes the prefetching of the primitives that closest to the current position and that are located on the same navigable path as the current position.

In some embodiments, streaming system 100 may generate a different heatmap for each detected navigable path. The heatmap for a particular navigable path identifies the primitives that are visible or positioned adjacent to that particular navigable path and includes the priority values for the minimum distance between the identified primitives and the particular navigable path.

Figure 3:
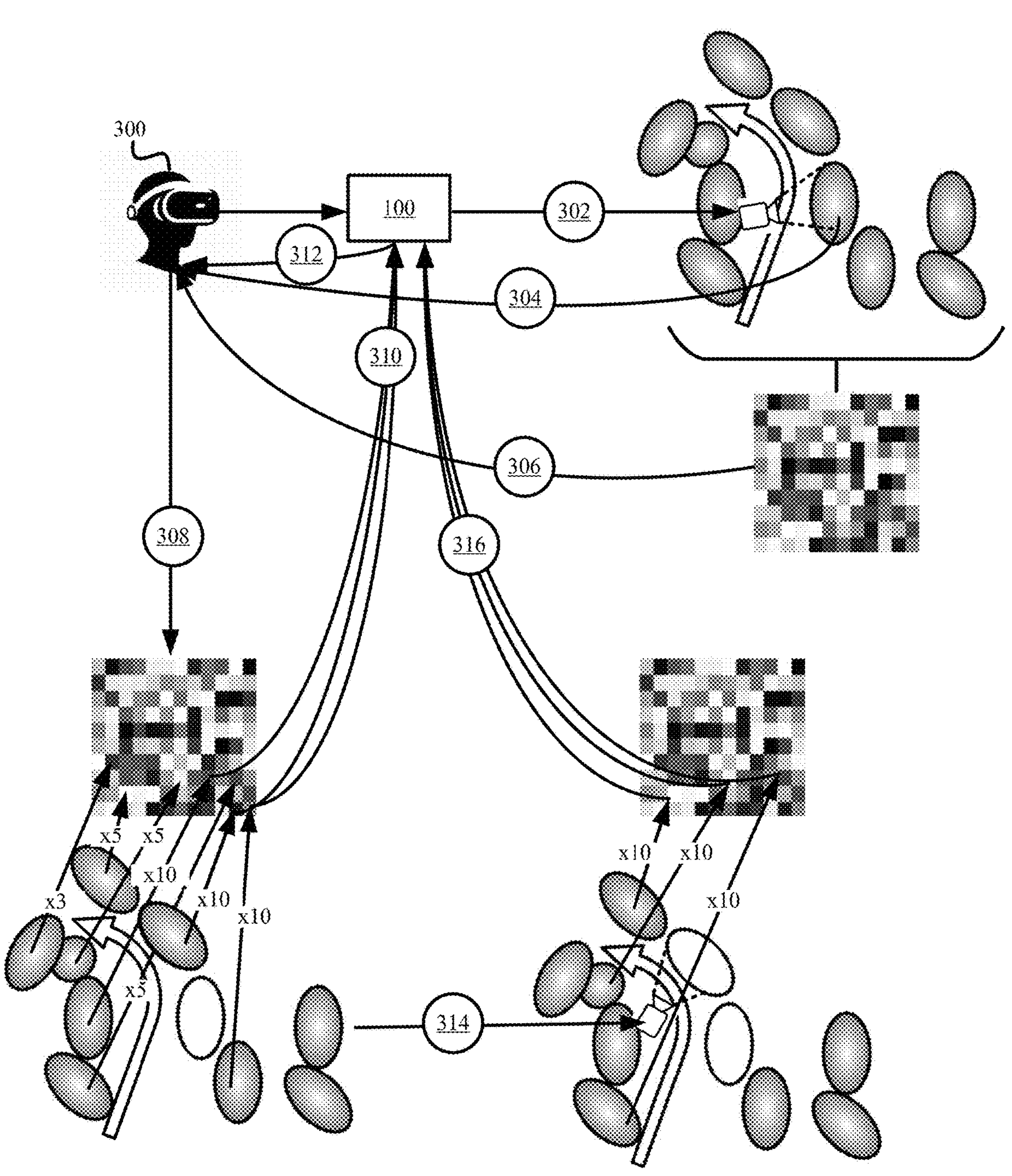
FIG. 3 illustrates an example of dynamically changing the heatmap priority values based on the current user position about a navigable path in accordance with some embodiments.

FIG. 3 illustrates an example of dynamically changing the heatmap priority values based on the current user position about a navigable path in accordance with some embodiments. Client device 300 requests (at 302) the primitives within a field-of-view from a current position about a current navigable path. Streaming system 100 streams (at 304) the requested primitives to client device 300. Moreover, streaming system 100 sends (at 306) the heatmap that includes the priority values for the primitives that are located about the current navigable path.

Client device 300 receives (at 306) the heatmap and adjusts (at 308) the heatmap values of the primitives based on their distance to the current position. The heatmap values for primitives that are not in the field-of-view and that are closest to the current position receive a larger boost or increase than the heatmap values for primitives that are not in the field-of-view and that are farther from the current position.

In some embodiments, the adjustment (at 308) of the heatmap values may also depend on the orientation of the virtual camera at the current position relative to the surface normal of the primitives. For instance, a primitive with a surface normal that is directed to a front of the virtual camera may receive a higher adjustment than a primitive with a surface normal that is directed to a back of the virtual camera.

In some embodiments, the adjustment (at 308) of the heatmap values is based on additional prefetch criteria. The prefetch criteria may adjust (at 308) the heatmap values according to expected, predicted, or tracked virtual camera movements or frustum changes. For instance, if a virtual camera is rotated to the right, the heatmap values for the primitives in that direction (e.g., primitives that are moving closer to the virtual camera and are in the virtual camera path) may be increased relative to the heatmap values for the primitives in the opposite direction (e.g., primitives that are being moved away from and that are to the left of the virtual camera) which may be decreased. The prefetch criteria may adjust (at 308) the heatmap values based on primitive popularity or importance. The primitive popularity or importance may be defined through creative intent or may be dynamically determined by tracking viewing of the primitives and/or the different amounts of time that the primitives along a navigable path remain in a field-of-view are in a user focus. Primitives along the navigable path, that are closest to the current position, and that have a higher popularity or importance may receive a greater increase or adjustment to their heatmap values than primitives with lower popularity or importance. The prefetch criteria may adjust (at 308) the heatmap values based on primitives that are static or dynamic. Static primitives include those primitives that remain unchanged and/or are visible for the entirety of the 3D content duration. Dynamic primitives includes those primitives that persist for less than the entire duration of the 3D content. Dynamic primitives may be associated with time-based animations or user-triggered actions. In some embodiments, the primitives may be defined with a parameter or attribute that designates the primitive as being static or dynamic. The heatmap values for static primitives may receive a larger adjustment (at 308) or increase than the heatmap values for dynamic primitives. The prefetch criteria may adjust (at 308) the heatmap values based on their proximity to target positions about a navigable path. The target positions may include positions about a navigable path that the virtual camera or user position may immediately jump to from a current position without traversing other position along the navigable path between the target position and the current position. Accordingly, the prefetch criteria may prioritize the prefetching of primitives that are closest to a target position along the current navigable path or a nearby navigable path or a target position that is accessible from the current position.

In some embodiments, streaming system 100 determines the current position about the current navigable path and adjusts (at 308) the heatmap values before distributing the heatmap with the adjusted (at 308) values to client device 300. In some such embodiments, client device 300 receives updated heatmap for every new position or updated field-of-view that is requested from streaming system 100.

Client device 300 generates (at 310) prefetch requests for the subset of primitives that are not in the current field-of-view and that have the largest adjusted (at 308) heatmap values. The prefetch requests may be issued sequentially or one-by-one by selecting the primitives with the largest adjusted (at 308) heatmap values followed by the primitives with lesser and lesser adjusted (at 308) heatmap values until the field-of-view changes or is updated. Streaming system 100 streams (at 312) the subset of primitives identified in the prefetch requests.

Client device 300 requests (at 314) an updated field-of-view. Streaming system 100 streams the primitives positioned in the updated field-of-view that were not previously streamed to the user device. If the updated field-of-view includes prefetched primitives, then client device 300 may generate the updated field-of-view by rendering the prefetched primitives that are stored in client device 300 cache.

Client device 300 or streaming system 100 adjusts (at 316) the heatmap priority values based on the updated distance of the primitives to the new position about the navigable path in the updated field-of-view. Client device 300 may prefetch (at 318) a different subset of primitives based on the newly adjusted (at 316) heatmap priority values, wherein the different subset of primitives include primitives that are not in the updated field-of-view, that have not been previously requested by or streamed to client device 300, and that have the largest adjusted (at 316) heatmap priority values.

Figure 4:
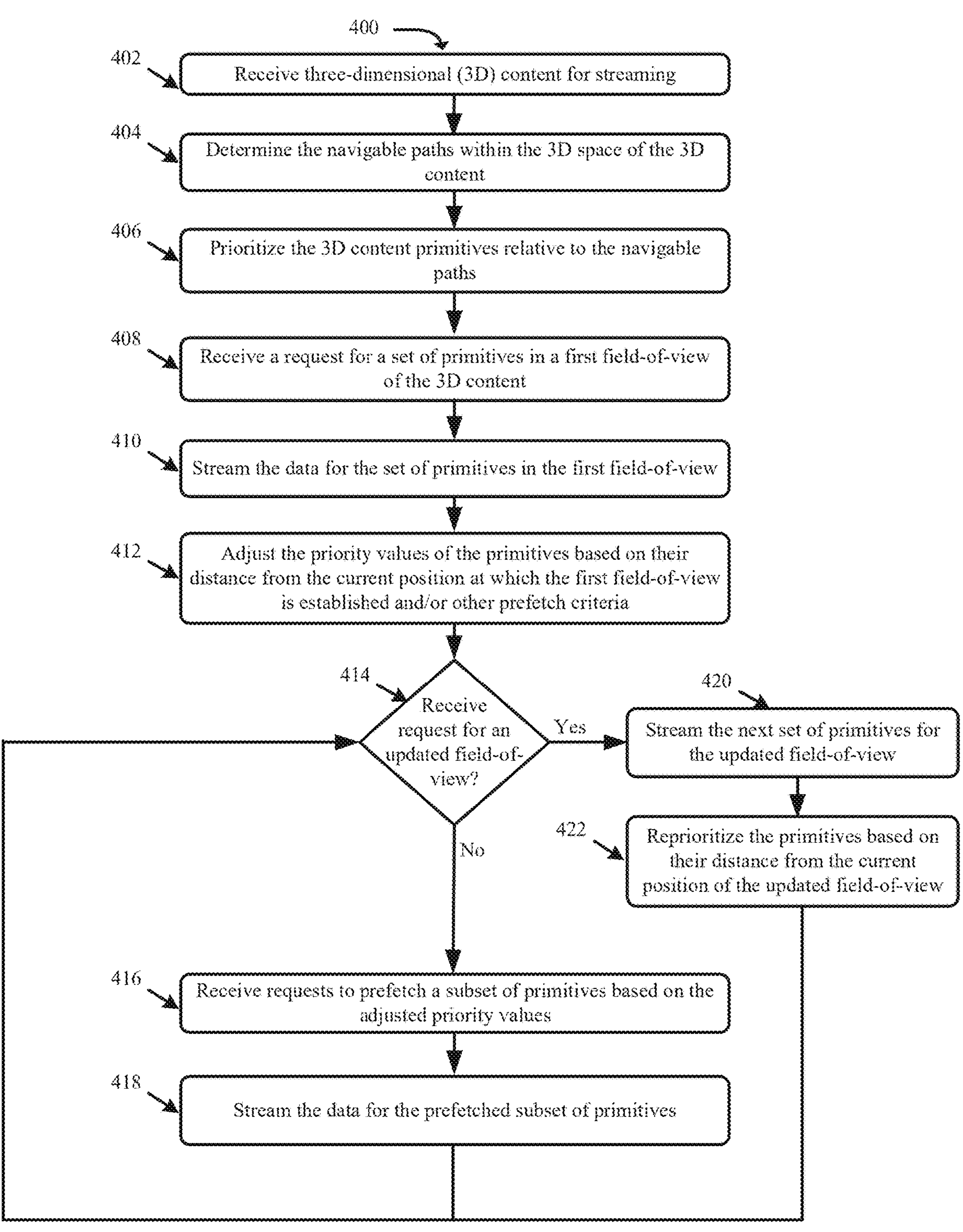
FIG. 4 presents a process for the dynamic 3D content prefetching in accordance with some embodiments presented herein.

FIG. 4 presents a process 400 for the dynamic 3D content prefetching in accordance with some embodiments presented herein. Process 400 may be implemented by streaming system 100 or by coordinated operation of streaming system 100 and a client device that streams 3D content from streaming system 100.

Streaming system 100 includes one or more devices or machines with processor, memory, storage, network, and/or other hardware resources for streaming 3D content to different requesting user devices over a data network. Streaming system 100 may be part of an online streaming platform that offers on-demand or real-time streaming of 3D movies, 3D games, static 3D objects or environments, and/or other interactive 3D experiences.

Process 400 includes receiving (at 402) 3D content for streaming. The 3D content may include static or dynamic 3D content. The 3D content may be defined in any one of several different 3D formats. For instance, the 3D content may be defined with meshes for a mesh model encoding of the 3D content, points for a point cloud encoding of the 3D content, or splats for a Gaussian splat encoding of the 3D content. Accordingly, receiving (at 402) the 3D content includes receiving the primitives that define the 3D content with each primitive being defined with at least one position in 3D space and visual characteristics that are presented at that position (e.g., color values, opacity, reflectivity, etc.) in the 3D space.

Process 400 includes determining (at 404) the navigable paths within the 3D space of the 3D content. In some embodiments, streaming system 100 determines (at 404) the navigable paths by rendering the 3D content and simulating movement within the 3D space to detect obstructions that prevent movement and paths about which to move within the 3D space. In some such embodiments, streaming system 100 may use an AI simulator to simulate movement within the 3D space of the 3D content in order to detect obstructions and where the navigable paths lie. In some other embodiments, streaming system 100 determines (at 404) the navigable paths based on the defined positions of the primitives. For instance, streaming system 100 may detect walls or obstructions based on primitives that have a y-coordinate value that is greater than the y-coordinate of the ground surface or plane. The navigable paths may lay in between walls or obstructions on either side. In still some other embodiments, streaming system 100 determines (at 404) the navigable paths by using image or feature recognition. Streaming system 100 may render different views of the 3D content and use image or feature recognition to detect pathways between objects in the different views.

Process 400 includes prioritizing (at 406) the 3D content primitives relative to the navigable paths. Prioritizing (at 406) the 3D content primitives may include determining the minimum distance between each primitive and a closest point about each navigable path and assigning a priority value to the primitive according to that minimum distance. In some embodiments, prioritizing (at 406) the 3D content primitives includes generating the heatmap that associates priority values to the primitives based on their proximity or distance to a navigable path.

Process 400 includes receiving (at 408) a request for a set of primitives in a first field-of-view of the 3D content. The request may specify the first field-of-field by requesting each primitive of the set of primitives, defining the coordinates for the first field-of-view, or specifying a virtual camera position or orientation in the 3D space of the 3D content from which streaming system 100 determines the set of primitives that fall in the first field-of-view of the virtual camera at the specified position with the specified orientation. The request is issued over a data network from a client device that streams 3D content and/or other content from streaming system 100.

Process 400 includes streaming (at 410) the data for the set of primitives in the first field-of-view. In some embodiments, streaming system 100 selects the set of primitives based on a definition of the first field-of-view or a definition of a virtual camera position and orientation provided in the request. In some other embodiments, streaming system 100 selects the set of primitives based on the first field-of-view being an initial or default field-of-view at which the 3D content is presented when first requested.

Process 400 includes adjusting (at 412) the priority values of the primitives based on their distance from the current position at which the first field-of-view is established and/or other prefetch criteria. The priority values of primitives that are closer to the current position receive a greater increase than the priority values of primitives that are progressively farther from the current position. The prefetch criteria may also influence the priority value adjustment (at 412) by accounting for primitive proximity to a probable or predicted camera frustum position and/or view direction, primitive importance (e.g., as determined from tracked viewing of the primitives), primitive state (e.g., static or dynamic), and/or proximity to accessible target or jump positions from the current navigable path position.

In some embodiments, streaming system 100 provides the unadjusted priority values to the requesting user device with the streamed (at 410) set of primitives. In some such embodiments, the requesting user device adjusts (at 412) the priority values.

Process 400 includes determining (at 414) whether a request for an updated field-of-view is received from the user device. The field-of-view may remain the same so long as the user does not provide input to change the field-of-view. Changing the field-of-view may include looking at a different part of the 3D content or moving within the 3D space of the 3D content in response to user input. The field-of-view may also change in response to dynamic elements or animations defined as part of the 3D content.

Process 400 includes determining (at 414—No) that the field-of-view remains unchanged in response to receiving (at 416) prefetch requests for a subset of primitives. The requesting user device selects the subset of primitives to prefetch based on the adjusted (at 412) priority values. The subset of primitives include primitives that are outside the first field-of-view and that are closest to a navigable path and the current position. The number of primitives that are prefetched depends on the amount of time that remains after streaming (at 410) the set of primitives to the user device before the user device requests a next field-of-view. Streaming system 100 may receive (at 416) the prefetch requests during or upon completion of streaming (at 410) the set of primitives. In some other embodiments, streaming system 100 prefetches the subset of primitives without prefetch requests from the user device after streaming (at 410) the set of primitives and not receiving a request for an updated field-of-view from the user device.

Process 400 includes streaming (at 418) the prefetched subset of primitives to the requesting user device while the previously requested field-of-view remains unchanged. Streaming system 100 streams (at 418) the prefetched subset of primitives in order to provide user device with primitives that are have the highest likelihood or probability of being requested next.

In response to receiving (at 414—Yes) a request for an updated field-of-view, process 400 includes streaming (at 420) the next set of primitives for the updated field-of-view. In particular, streaming system 100 streams (at 420) all primitives in the updated field-of-view or new primitives that were not previously prefetched or streamed for a previous field-of-view. Process 400 further includes reprioritizing (at 422) the primitives or the primitive priority values based on their distance from the current position of the updated field-of-view. In some embodiments, the primitive reprioritization (at 422) is performed by the user device based on unadjusted priority values that streaming system 100 provides to the user device. In some other embodiments, streaming system 100 performs the primitive reprioritization (at 422) by calculating the distances of the primitives to the current position about the current navigable path in the updated field-of-view. Process 400 includes determining (at 414) whether the updated field-of-view changes again or if primitives may be prefetched for the updated field-of-view. Process 400 continues until the viewing of the 3D content is complete.

In some embodiments, the user device may continuously prefetch primitives for requested 3D content based on available bandwidth. In some such embodiments, the 3D content may be streamed at a particular frame rate (e.g., 30 frames per second). The field-of-view may remain unchanged over a set of frames or the data for primitives that change from one frame to the next may result in some of the available bandwidth being unused. The user device may continuously perform the prefetching to make use of the unused bandwidth and improve the overall streaming experience.

The continuous 3D content prefetching may be implemented by the user device. The user device determines the amount of data that may be requested or streamed for every frame of the requested 3D content. The amount of data may be determined based on network performance (e.g., bandwidth or throughput) and the frame rate at which the 3D content is requested or changes to the 3D content are streamed. For a current frame of the 3D content, the user device requests the primitives for rendering the field-of-view associated with the current frame. The requested primitives may include all primitives in the current field-of-view defined for the current frame or may include primitives that have changed from a last frame to a current frame. The user device determines the data associated with the requested primitives based on the 3D content manifest, determines an amount of remaining data that may be requested for the current frame based on the total amount of data that may be requested for each frame less the data associated with the requested primitives, and prefetches (e.g., issues prefetch requests) primitives that are predicted to be included in a next frame or field-of-view based on the adjusted priority values of the primitives that are closest to the current position about the current navigable path. The continuous prefetching improves the streaming experience by minimizing the risk of buffering or other interruption when the amount of data that is to be streamed for a given frame exceeds the available bandwidth. For these frames, the prefetched primitives may be applied to the given frame to reduce the amount of data that is streamed for that given frame.

Streaming system 100 may use object or feature recognition to improve the relevance of the prefetched primitives. For instance, the 3D content may have parallel navigable paths that are separated by walls or obstructions. The object or feature recognition identifies the walls or obstructions and prevents the prefetching of primitives behind the walls or obstructions regardless of their distance to the current position about a navigable path.

Figure 5:
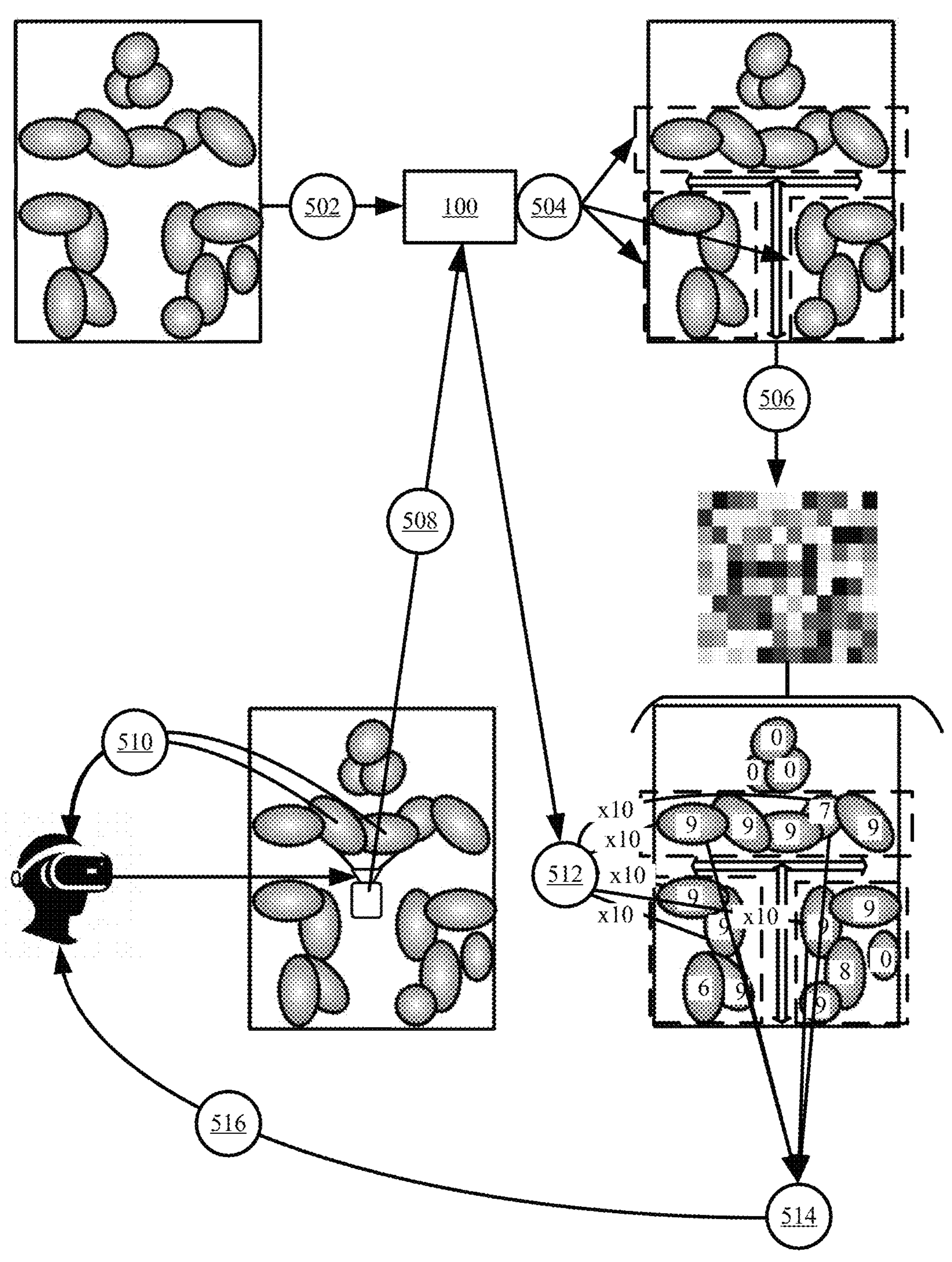
FIG. 5 illustrates an example of enhancing the dynamic 3D content prefetching with feature recognition in accordance with some embodiments presented herein.

FIG. 5 illustrates an example of enhancing the dynamic 3D content prefetching with feature recognition in accordance with some embodiments presented herein. Streaming system 100 receives (at 502) the 3D content primitives. In this example, the 3D content primitives correspond to splats of a Gaussian splat encoding of the 3D content.

Streaming system 100 performs feature recognition and determines (at 504) obstructions along a detected navigable path that are created by different sets of the 3D content primitives. The feature recognition may include detecting common or continuous surfaces formed by each set of primitives and/or determining that those common or continuous surfaces cannot be passed through or penetrated (e.g., opaque or solid walls). In some embodiments, the feature recognition is performed by identifying bounding boxes for collision detection.

Streaming system 100 generates (at 506) the heatmap priority values for the primitives based on the proximity or distance of the primitives to an unobstructed navigable path. For instance, if a recognized obstruction created by one or more primitives is between a particular primitive and a navigable path, then the particular primitive is assigned a low priority value or a value of zero to indicate that the particular primitive should not be prefetched as it is not visible from that navigable path. If no recognized obstruction is between the particular primitive and a navigable path, then the particular primitive is assigned a priority value based on its minimum distance from the navigable path.

Streaming system 100 receives (at 508) user input that moves the current position about a navigable path towards a wall that prevents further forward movement but allows for movement to the right or left. There are multiple primitives defined or positioned about the other side of the wall. However, the feature recognition identifies the wall as an obstruction along the current navigable path such that streaming system 100 assigns the multiple primitives on the other side or behind the wall a priority value of zero with reference to the current navigable path despite the minimum distance between the multiple primitives on the other side and the current position about the current navigable path. The priority value of zero indicates that the multiple primitives are not visible from the current position.

Streaming system 100 streams (at 510) the set of primitives that are visible from the current position about the navigable path. The set of primitives correspond to the primitives within the field-of-view established with a virtual camera at the current position about the navigable path.

Streaming system 100 adjusts (at 512) the heatmap priority values for the primitives outside the current field-of-view based on their proximity or distance from the current position about the navigable path and based on their visibility or amount of obstruction from the navigable path. The priority values for primitives that are obstructed from the navigable path remain at zero or at a low value.

Streaming system 100 selects (at 514) a subset of primitives to prefetch that are not obstructed from the current navigable path or the current position about the current navigable path and that are positioned closest to the current position about the current navigable path. The selection (at 514) of the subset of primitives is based on the adjusted (at 512) heatmap priority values.

Streaming system 100 streams (at 516) the prefetched subset of primitives to the user device in response to one or more prefetch requests from the user device. The prefetched subset of primitives excludes the primitives on the other side of the obstruction that are not visible regardless of where the user moves about the current navigable path, and includes the primitives that would be immediately visible about the navigable path should the user provide input that changes the current position about the navigable path or changes the field-of-view.

In some embodiments, the requested 3D content may be encoded at different fidelities or levels-of-detail (LoDs). For instance, a first LoD encoding of the 3D content may be defined with a lesser number of larger primitives that reconstruct the visual detail of the 3D content with greater loss and less detail and a second LoD encoding of the 3D content may be defined with a greater number of smaller primitives that reconstruct the visual detail of the 3D content with less loss and more detail. Other LoD encodings may define the 3D content at other fidelities using different numbers of different sized splats. Accordingly, streaming system 100 has the option to stream and prefetch the 3D content primitives at the different LoDs and may use the different LoD encodings to maximize bandwidth utilization and/or provide a real-time streaming experience.

Figure 6:
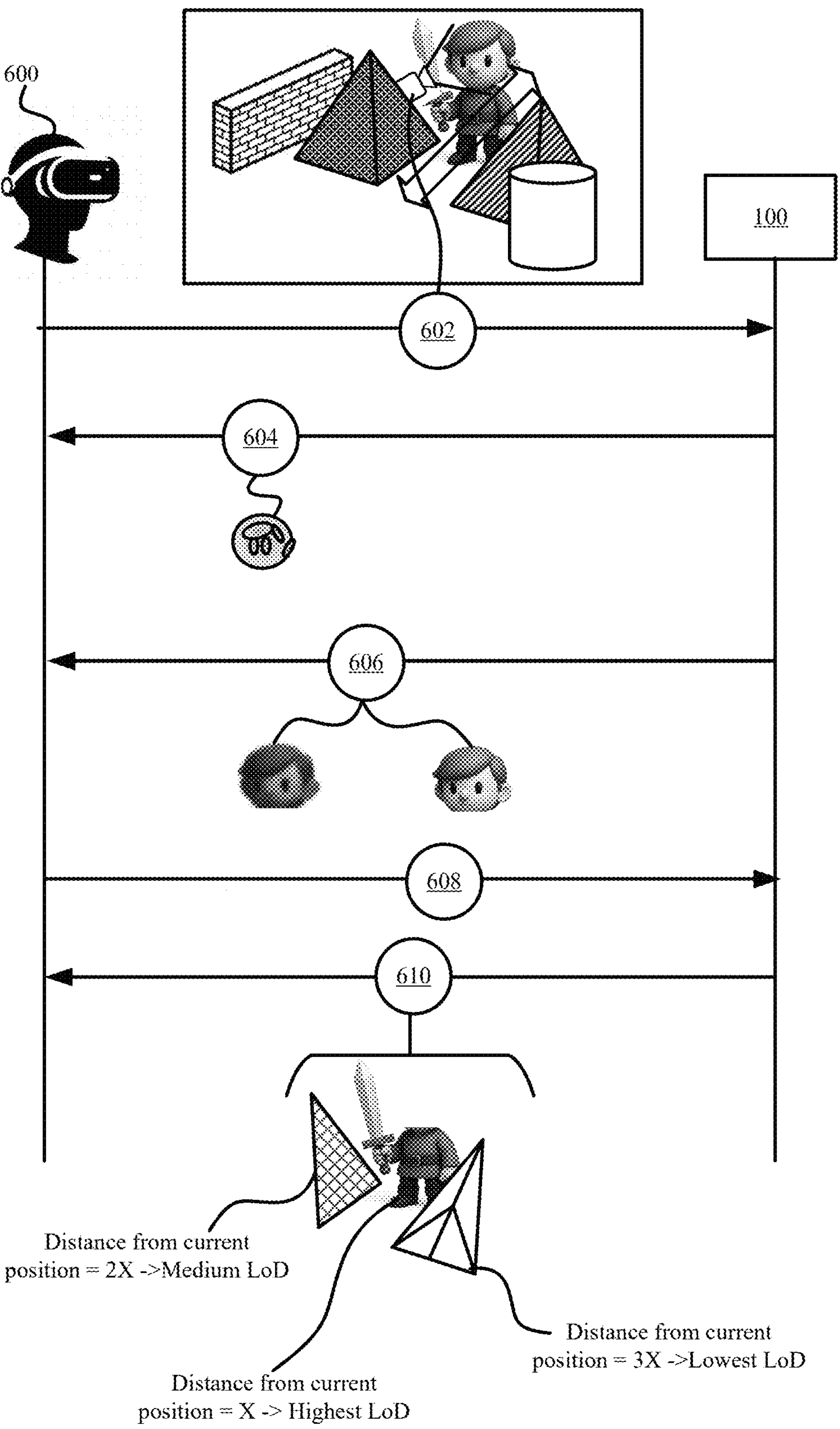
FIG. 6 illustrates an example of dynamically prefetching 3D content at different levels-of-detail (LoDs) in accordance with some embodiments presented herein.

FIG. 6 illustrates an example of dynamically prefetching 3D content at different LoDs in accordance with some embodiments presented herein. Client device 600 sends and streaming system 100 receives (at 602) a request for presenting 3D content from a particular field-of-view.

Streaming system 100 streams (at 604) a first set of primitives that reconstruct the particular field-of-view at a lowest LoD so that an initial visualization of the particular field-of-view may be generated on client device 600 with the least delay. Streaming system 100 streams (at 606) a second set of primitives that reconstruct the particular field-of-view at a next higher LoD after streaming (at 604) the first set of primitives. In some embodiments, the second set of primitives may be added to and rendered with the first set of primitives to increase the 3D content detail. In some other embodiments, the second set of primitives replace one or more of the first set of primitives in order to increase the 3D content detail. Streaming system 100 may continue to stream the particular field-of-view or different parts of the particular field-of-view at increasing LoDs so long as the particular field-of-view does not change. For instance, streaming system 100 may increase the LoD for the primitives at the foreground and/or center of the particular field-of-view while the background and/or periphery of the particular field-of-view at a lower LoD.

Client device 600 may issue prefetch requests (at 608) for a third set of primitives that are not in the current field-of-view, closest to the navigable path, and are visible or not obstructed from the navigable path. The prefetch requests (at 608) may identify each primitive of the third set of primitives or may generally specify a request to prefetch primitives while the current field-of-view remains unchanged.

Streaming system 100 prefetches and streams (at 610) the third set of primitives to client device 600. In some embodiments, streaming system 100 maximizes the amount of prefetched primitives by selecting each primitive of the third set of primitives to be at the lowest LoD. The lowest LoD encoding for the third set of primitives allows streaming system 100 to select more primitives that are about the navigable path and further away from the current position than selecting primitives at higher LoDs that are encoded with more data. In other words, the lowest LoD encoding allows for more primitives spanning more regions to be prefetched in the same data envelope than primitives encoded at higher LoDs. As shown in FIG. 6, streaming system 100 prefetches and streams (at 610) the third set of primitives at different LoDs based on their adjusted priority values. Primitives with the highest adjusted priority values are prefetched (at 610) at higher LoDs than primitives with lower adjusted priority values. The adjusted priority values may correspond to a probability or likelihood that a prefetched primitive will be used or presented. Accordingly, streaming system 100 may avoid prefetching (at 610) primitives with a high usage probability at a low LoD and later a high LoD. The primitives with the highest adjusted priority values may include those primitives closest to the current position of the particular field-of-view and closest to the navigable path associated with the particular field-of-view.

The priority values may also be used for dynamic cache eviction by the client device receiving and caching the prefetched primitives. The priority values allow the client device to more intelligently manage the cache and retain the primitives that have a highest likelihood of being used or presented in a next field-of-view while evicting the primitives that have the lowest likelihood of being used or presented regardless of the amount of time the primitives remain in the client device cache.

Figure 7:
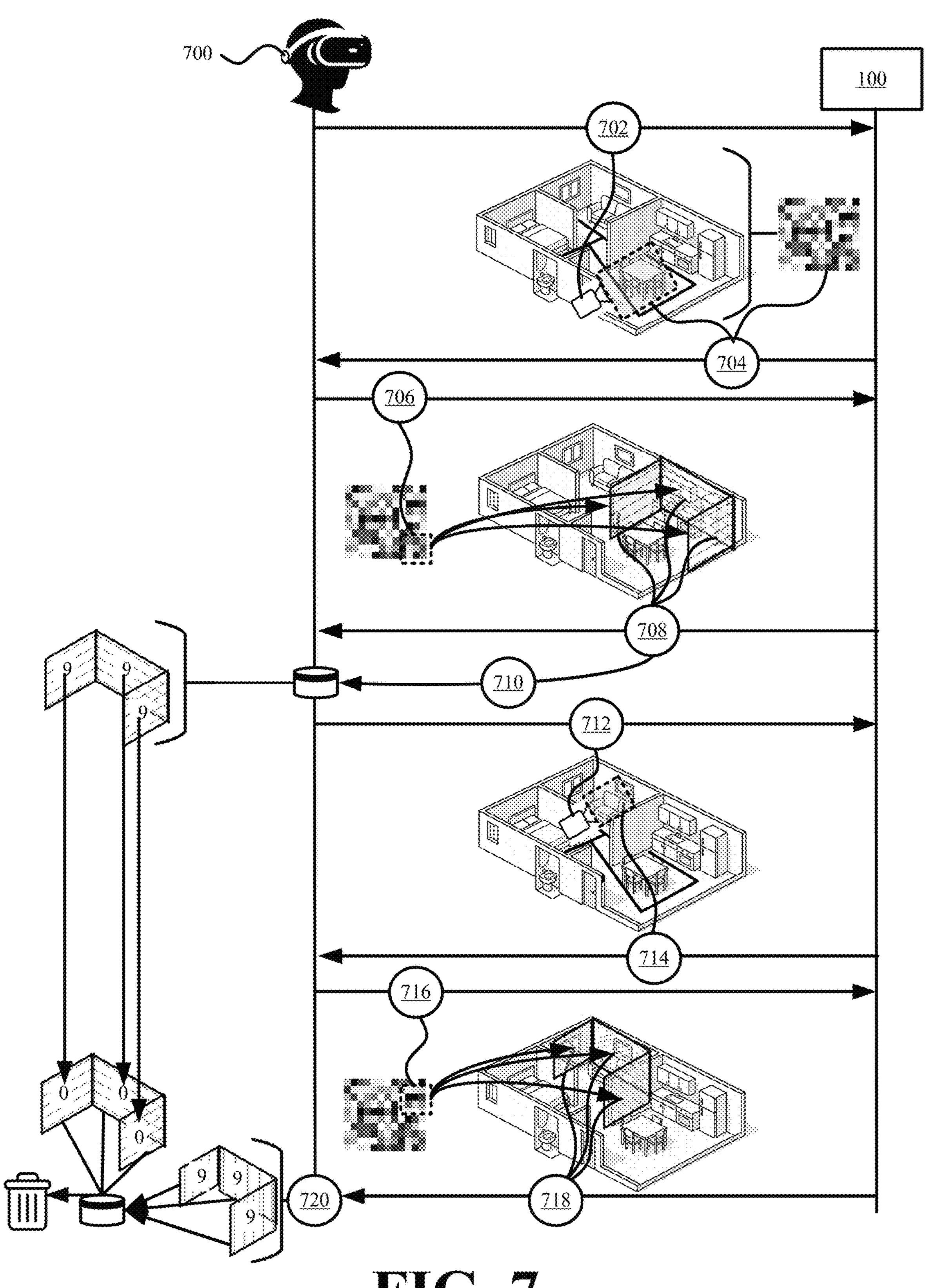
FIG. 7 illustrates an example of the dynamic cache eviction in accordance with some embodiments presented herein.

FIG. 7 illustrates an example of the dynamic cache eviction in accordance with some embodiments presented herein. Client device 700 requests (at 702) 3D content from a particular field-of-view and receives (at 704) primitives that are within the requested field-of-view from streaming system 100. Client device 700 may also receive the heatmap with or without adjusted priority values for the primitives outside the requested field-of-view and their distance to a navigable path or the current position about the current navigable path.

Client device 700 requests (at 706) and receives (at 708) prefetched primitives that are outside the requested field-of-view from streaming system 100 while the field-of-view remains unchanged. In some embodiments, client device 700 requests (at 706) the prefetched primitives after requesting (at 702) and/or receiving (at 704) the primitives for the requested field-of-view. In some other embodiments, streaming system 100 streams (at 708) the prefetched primitives after the primitives for the requested field-of-view as part of the request for the particular field-of-view.

Client device 700 renders the primitives for the particular field-of-view in order to generate a visualization of the particular field-of-view. Client device 700 caches (at 710) the prefetched primitives in a local memory or cache buffer.

Client device 700 may change the field-of-view in response to user input or dynamic changes defined as part of the 3D content. Accordingly, client device 700 may request (at 712) an updated field-of-view from streaming system 100. Client device 700 may generate the updated field-of-view from primitives within the updated field-of-view that were prefetched and that reside in cache and from other primitives that are not in cache and that are received (at 714) from streaming system 100.

Client device 700 may prefetch (at 716) additional primitives that are not in the updated field-of-view, that are along the navigable path associated with the updated field-of-view, and that are closest to the current position associated with the updated field-of-view. Streaming system 100 streams (at 718) the additional primitives to client device 700. The cache may be full or become full after or during the prefetching (at 716) of the additional primitives.

Client device 700 performs (at 720) a dynamic cache eviction to determine which prefetched primitives to retain in cache and which prefetched primitives to evict or remove from the cache. The dynamic cache eviction includes adjusting the priority values of the cached and/or prefetched primitives based on their position relative to the current navigable path associated with the updated field-of-view and the current position associated with the updated field-of-view. Prefetched primitives that are obstructed from the current navigable path or that are associated with a different navigable path may be evicted first. For instance, if the current position changes from a first navigable path associated with a first room in a house or building to a second navigable path associated with a second room, client device 700 may evict all prefetched or cached primitives associated with the first room from cache and may begin to prefetch and cache primitives associated with the second room. Prefetched primitives that are about the current navigable path and that are furthest from the current path are evicted next if more space is needed in the cache to store prefetched primitives that are outside the updated field-of-view and closest to the current position.

The dynamic cache eviction eliminates the temporal component from the eviction decision. Instead, the dynamic cache eviction involves comparing the position of the cached primitives to the current position of the current navigable path, and evicts primitives that are not along or visible from the current navigable path and that are positioned farthest from the current position. In this manner, client device 700 increases the likelihood or probability that the cached primitives are used for a next field-of-view.

In some embodiments, performing (at 720) the dynamic cache eviction includes accounting for additional criteria in selecting which prefetched primitives to evict from cache. The dynamic cache eviction may evict primitives associated with a higher resolution encoding or higher LoD of the 3D content before primitives associated with a lowest resolution encoding or lowest LoD of the 3D content. The additional criteria may affect the priority value adjustment or may be separately accounted for when selecting between different primitives with low priority values to evict from cache.

In some embodiments, the dynamic cache eviction may involve moving evicted primitives from a higher-priority cache to a lower-priority cache. In some such embodiments, client device 700 may cache the prefetched primitives with the highest priority in memory and may cache the prefetched primitives with lower priorities in slower disk or storage. Accordingly, evicting the prefetched primitives may include moving primitives from memory to disk or storage and/or deleting primitives from disk or storage.

Figure 8:
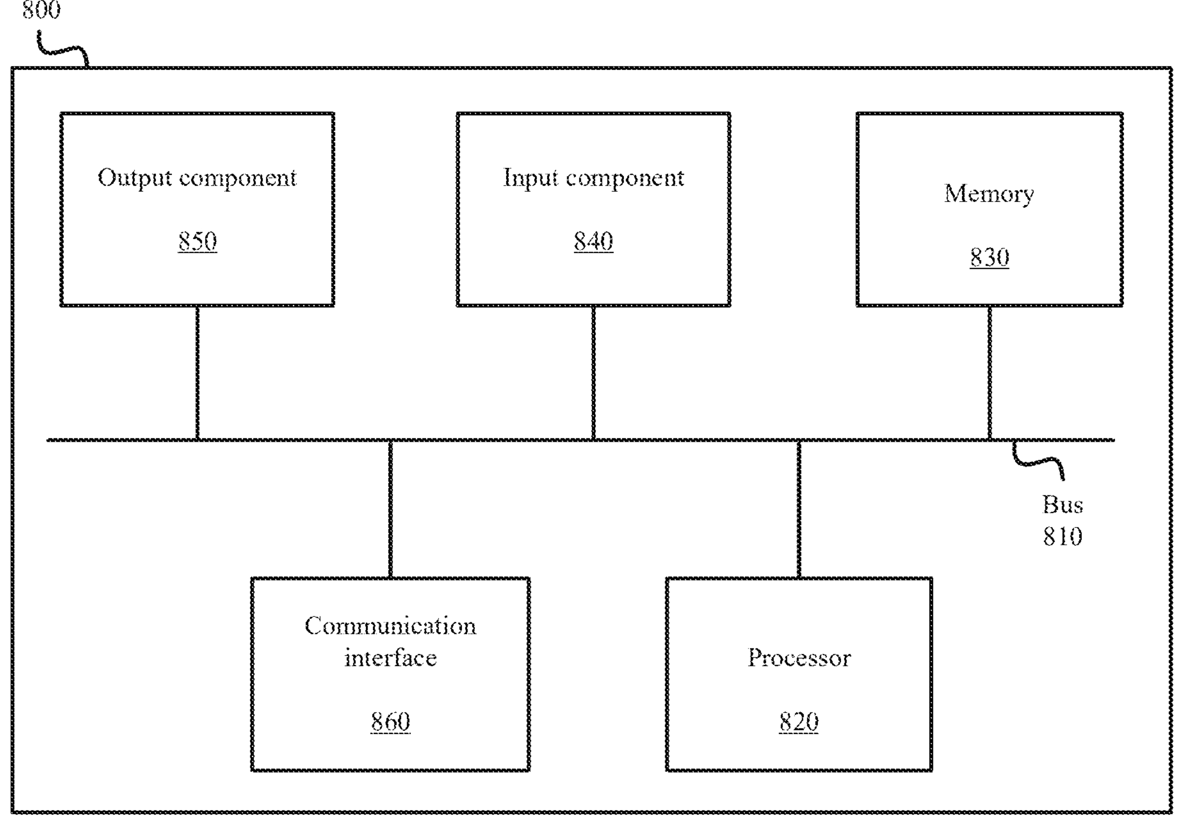
FIG. 8 illustrates example components of one or more devices, according to one or more embodiments described herein.

FIG. 8 is a diagram of example components of device 800. Device 800 may be used to implement one or more of the tools, devices, or systems described above (e.g., streaming system 100, client device 700, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:

receiving three-dimensional (3D) content comprising a plurality of primitives defined in a 3D space;

determining one or more navigable paths within the 3D space of the 3D content without user input, wherein determining the one or more navigable paths comprises detecting connected regions in the 3D space of the 3D content that do not obstruct movement of a virtual camera based on an analysis of the plurality of primitives;

receiving a first request from a client device to present the 3D content from a first field-of-view based on a first position about a particular navigable path from the one or more navigable paths;

providing the client device with a manifest that lists first priority values for the plurality of primitives, wherein the first priority value for a first priority value primitive from the plurality of primitives is adjusted based on a distance of the first priority value primitive to the first position about the particular navigable path and an amount by which the first priority value primitive is obstructed from the particular navigable path;

streaming a first set of primitives from the plurality of primitives that are positioned within the first field-of-view to the client device over a data network;

prefetching a second set of primitives from the plurality of primitives that are positioned outside the first field-of-view based on the first priority values of the second set of primitives in the manifest being greater than the first priority values of other primitives listed in the manifest, wherein the first priority values of the second set of primitives indicate that the second set of primitives are exposed to the particular navigable path in the first field-of-view without another primitive being positioned between each primitive of the second set of primitives and the particular navigable path;

streaming the second set of primitives to the client device over the data network while the first field-of-view remains unchanged;

receiving a second request from the client device to present the 3D content from a second field-of-view based on a second position about the particular navigable path; and providing the client device with an updated manifest that adjusts the first priority values to second priority values for the plurality of primitives, wherein the second priority value for a second priority value primitive from the plurality of primitives is adjusted based on a distance of the second priority value primitive to the second position and an amount by which the corresponding second priority value primitive is obstructed from the particular navigable path.

2. The method of claim 1 further comprising:

adjusting the first priority value for each particular primitive of the plurality of primitives based on a degree with which a surface normal of the particular primitive is directed to the first position about the particular navigable path.

3. The method of claim 2 further comprising:

adjusting the first priority value for each individual primitive of the plurality of primitives based on a distance between the individual primitive and the particular navigable path.

4. The method of claim 1 further comprising:

adjusting the first priority value for each primitive based on an offset between a direction that each primitive of the plurality of primitives faces and the particular navigable path.

5. The method of claim 4 further comprising:

receiving prefetch requests from the client device for the second set of primitives that have greater first priority values in the manifest than the other primitives of the plurality of primitives.

6. The method of claim 1, wherein determining the one or more navigable paths further comprises:

defining the one or more navigable paths in between different sets of primitives that are separated by a distance.

7. The method of claim 1, wherein determining the one or more navigable paths further comprises:

defining the one or more navigable paths based on regions in the 3D space in which the plurality of primitives are not positioned above a ground plane.

8. The method of claim 1 further comprising:

detecting a third set of primitives from the plurality of primitives that are closer to the first position about the particular navigable path than the second set of primitives and that are obstructed from the particular navigable path by one or more other primitives; and decreasing the first priority values of the third set of primitives to be less than the first priority values of the second set of primitives based on the third set of primitives being obstructed from the particular navigable path and the second set of primitives being unobstructed from the particular navigable path.

9. The method of claim 1 further comprising:

prioritizing the plurality of primitives for prefetching based on their distance from the particular navigable path;

receiving a request for an updated field-of-view that is associated with a second navigable path of the one or more navigable paths that is different than the particular navigable path; and reprioritizing the plurality of primitives for prefetching based on their distance from the second navigable path.

10. The method of claim 9, wherein prioritizing the plurality of primitives comprises assigning a first set of priority values to the plurality of primitives based on their distance from the particular navigable path; and wherein reprioritizing the plurality of primitives comprises assigning a second set of priority values to the plurality of primitives based on their distance from the second navigable path.

11. The method of claim 9 further comprising:

streaming a third set of primitives from the plurality of primitives that are positioned within the updated field-of-view to the client device;

prefetching a fourth set of primitives from the plurality of primitives that are positioned outside the updated field-of-view, that are positioned nearest to the second navigable path in the updated field-of-view, and that have proximity to a current position about the second navigable path associated with the updated field-of-view; and streaming the fourth set of primitives to the client device over the data network while the updated field-of-view remains unchanged.

12. The method of claim 1, wherein streaming the second set of primitives comprises:

streaming a first subset of the second set of primitives at a first level-of-detail (LoD); and streaming a second subset of the second set of primitives at a second LoD that is less than the first LoD in response to the first subset being closer to the first position about the particular navigable path than the second subset.

13. The method of claim 1, wherein streaming the second set of primitives comprises:

streaming a first subset of the second set of primitives at a first LoD; and streaming a second subset of the second set of primitives at a second LoD that is less than the first LoD in response to the first subset being closer to the particular navigable path than the second subset.

14. The method of claim 1 further comprising:

adjusting the first priority values for the plurality of primitives by increasing the first priority value for a primitive with a surface normal that is directed towards the particular navigable path and by decreasing the first priority value for a primitive with a surface normal that is directed away from the particular navigable path.

15. A streaming system comprising:

one or more hardware processors configured to:

receive three-dimensional (3D) content comprising a plurality of primitives defined in a 3D space;

determine one or more navigable paths within the 3D space of the 3D content without user input, wherein determining the one or more navigable paths comprises detecting connected regions in the 3D space of the 3D content that do not obstruct movement of a virtual camera based on an analysis of the plurality of primitives;

receive a first request from a client device to present the 3D content from a first field-of-view based on a first position about a particular navigable path from the one or more navigable paths;

provide the client device with a manifest that lists first priority values for the plurality of primitives, wherein the first priority value for a first priority value primitive from the plurality of primitives is adjusted based on a distance of the first priority value primitive to the first position about the particular navigable path and an amount by which the first priority value primitive is obstructed from the particular navigable path;

stream a first set of primitives from the plurality of primitives that are positioned within the first field-of-view to the client device over a data network;

prefetch a second set of primitives from the plurality of primitives that are positioned outside the first field-of-view based on the first priority values of the second set of primitives in the manifest being greater than the first priority values of other primitives listed in the manifest, wherein the first priority values of the second set of primitives indicate that the second set of primitives are exposed to the particular navigable path in the first field-of-view without another primitive being positioned between each primitive of the second set of primitives and the particular navigable path;

stream the second set of primitives to the client device over the data network while the first field-of-view remains unchanged;

receive a second request from the client device to present the 3D content from a second field-of-view based on a second position about the particular navigable path; and provide the client device with an updated manifest that adjusts the first priority values to second priority values for the plurality of primitives, wherein the second priority value for a second priority value primitive from the plurality of primitives is adjusted based on a distance of the second priority value primitive to the second position and an amount by which the corresponding second priority value primitive is obstructed from the particular navigable path.

16. The streaming system of claim 15, wherein the one or more hardware processors are further configured to:

adjust the first priority value for each particular primitive of the plurality of primitives based on a degree with which a surface normal of the particular primitive is directed to the first position about the particular navigable path.

17. The streaming system of claim 16, wherein the one or more hardware processors are further configured to:

adjust the first priority value for each individual primitive of the plurality of primitives based on a distance between the individual primitive and the particular navigable path.

18. The streaming system of claim 15, wherein the one or more hardware processors are further configured to:

adjust the first priority value for each primitive based on an offset between a direction that each primitive of the plurality of primitives faces and the particular navigable path.

19. The streaming system of claim 18, wherein the one or more hardware processors are further configured to:

receive prefetch requests from the client device for the second set of primitives that have greater first priority values in the manifest than the other primitives of the plurality of primitives.

20. A non-transitory computer-readable medium storing instructions that, when executed by one or more processors of a streaming system, cause the streaming system to perform operations comprising:

receiving three-dimensional (3D) content comprising a plurality of primitives defined in a 3D space;

determining one or more navigable paths within the 3D space of the 3D content without user input, wherein determining the one or more navigable paths comprises detecting connected regions in the 3D space of the 3D content that do not obstruct movement of a virtual camera based on an analysis of the plurality of primitives;

receiving a first request from a client device to present the 3D content from a first field-of-view based on a first position about a particular navigable path from the one or more navigable paths;

providing the client device with a manifest that lists first priority values for the plurality of primitives, wherein the first priority value for a first priority value primitive from the plurality of primitives is adjusted based on a distance of the first priority value primitive to the first position about the particular navigable path and an amount by which the first priority value primitive is obstructed from the particular navigable path;

streaming a first set of primitives from the plurality of primitives that are positioned within the first field-of-view to the client device over a data network;

prefetching a second set of primitives from the plurality of primitives that are positioned outside the first field-of-view based on the first priority values of the second set of primitives in the manifest being greater than the first priority values of other primitives listed in the manifest, wherein the first priority values of the second set of primitives indicate that the second set of primitives are exposed to the particular navigable path in the first field-of-view without another primitive being positioned between each primitive of the second set of primitives and the particular navigable path;

streaming the second set of primitives to the client device over the data network while the first field-of-view remains unchanged;

receiving a second request from the client device to present the 3D content from a second field-of-view based on a second position about the particular navigable path; and providing the client device with an updated manifest that adjusts the first priority values to second priority values for the plurality of primitives, wherein the second priority value for a second priority value primitive from the plurality of primitives is adjusted based on a distance of the second priority value primitive to the second position and an amount by which the corresponding second priority value primitive is obstructed from the particular navigable path.

* * * * *